3 Sheets—Sheet 1.
L. BREVAL.
APPARATUS FOR EXPRESSING LIQUIDS.
No. 6,721. Reissued Nov. 2, 1875.
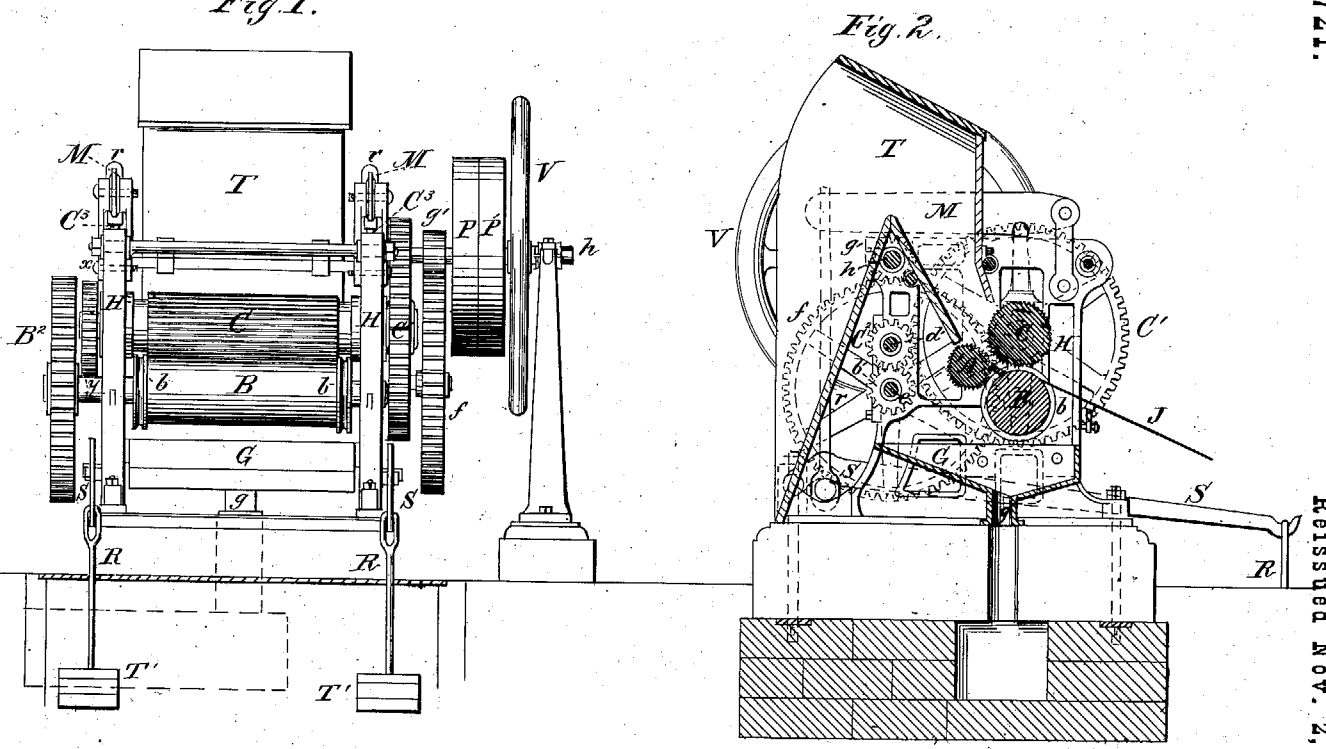
WITNESSES,
Nat E Oliphant
George H Jones
INVENTOR,
Laurent Breval,
per Charles H. Fowler
Attorney.

*R Sheets - Sheet 2.*

3 Sheets—Sheet 2.

L. BREVAL.

APPARATUS FOR EXPRESSING LIQUIDS.

No. 6,721. Reissued Nov. 2, 1875.

WITNESSES.
Nas E. Oliphant
George H. Jones

INVENTOR.
Laurent Breval.
per Charles H. Fowler,
Attorney.

Sheet 3.

3 Sheets—Sheet 3.

L. BREVAL.

APPARATUS FOR EXPRESSING LIQUIDS.

No. 6,721. Reissued Nov. 2, 1875.

Witnesses:

Nat E Oliphant

George H Jones

Inventor

Laurent Breval per Charles H. Fowler

Attorney.

UNITED STATES PATENT OFFICE.

LAURENT BREVAL, OF PARIS, FRANCE.

IMPROVEMENT IN APPARATUS FOR EXPRESSING LIQUIDS.

Specification forming part of Letters Patent No. 135,317, dated January 28, 1873; reissue No. 6,721, dated November 2, 1875; application filed April 26, 1875.

*To all whom it may concern:*

Be it known that I, LAURENT BREVAL, of Paris, France, have invented certain new and useful Improvements in Press for Extracting Liquid from Spent Tan-Bark or other like matter; and I do hereby declare that the following is a full, clear, and exact description thereof, reference being had to the accompanying drawings forming a part of this specification, and to the letters of reference marked thereon, in which—

Figure 3:
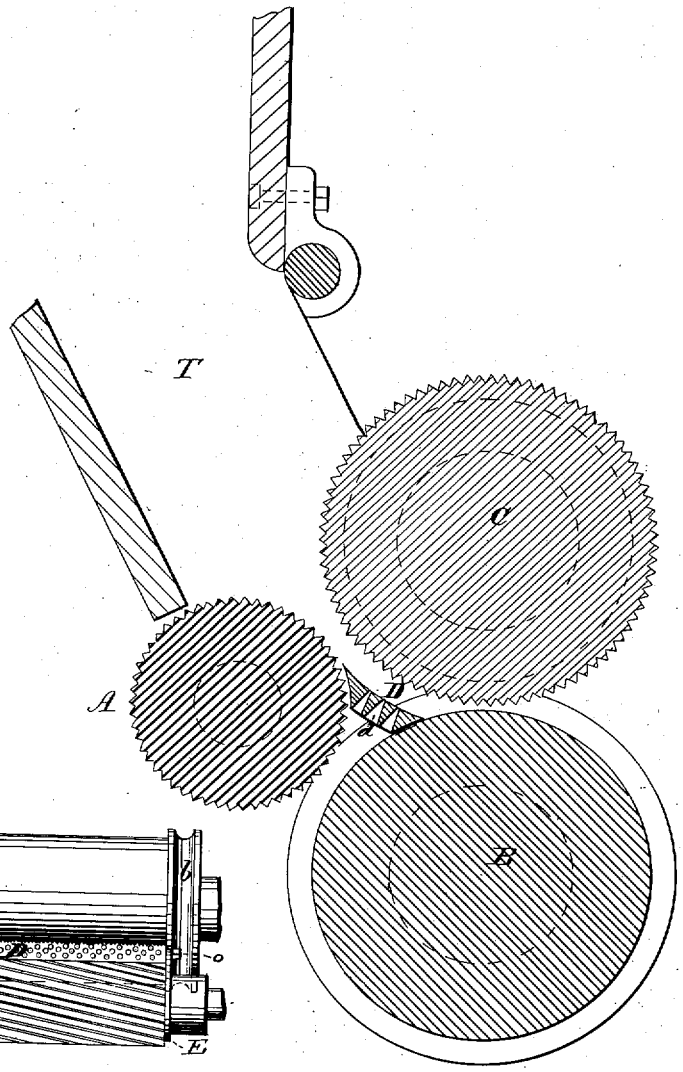
Figure 4:
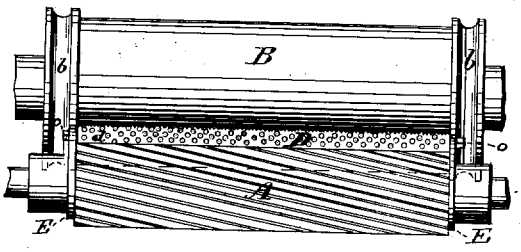
Figure 6:
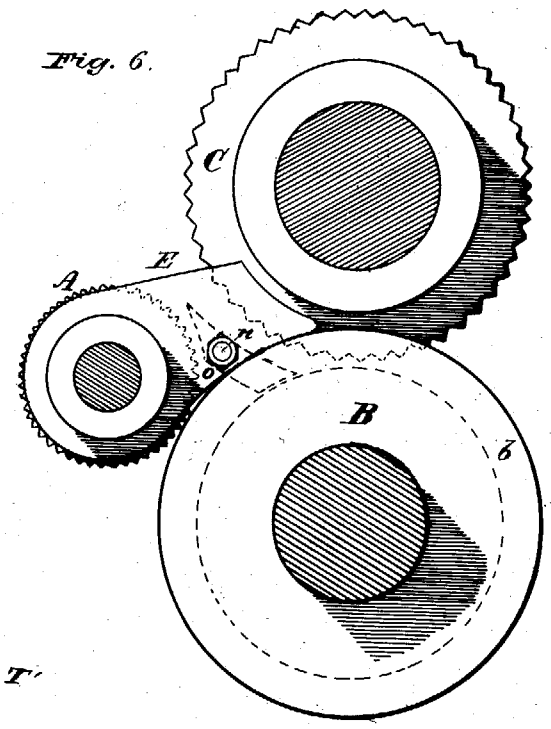
Figure 5:
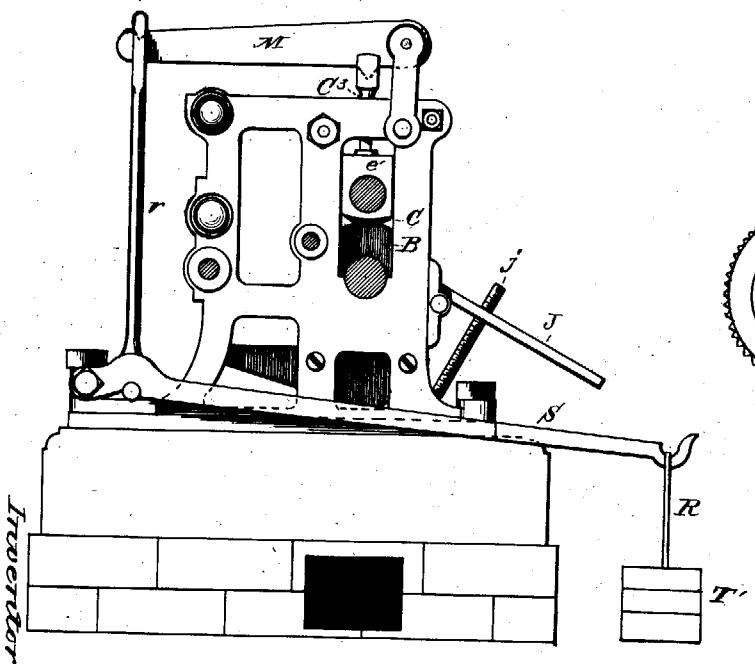

Figure 1 represents a front elevation, and Fig. 2 a vertical section, of such press. Fig. 3 represents a section on an enlarged scale of the delivery-roller, the bar or plate, and the compressing and feed rollers, hereinafter described. Fig. 4 represents a top view of the delivery-roller, the bar or plate, and the feed-roller; Fig. 5, a side elevation of the press; and Fig. 6, a side or end view of the several rollers, showing the manner of connecting and supporting the bar or plate over and above the space between the feed and delivery rollers.

This invention has relation to that class of presses used in expressing the liquid from spent tan-bark or other like matter; and my invention consists, in part, of a pressure-roller arranged to slide vertically and automatically within the frame of the machine, in connection with a delivery-roller formed with annular flanges, overlapping the ends of and acting as guides for the pressure-rollers, so as to prevent any lateral displacement of the same in its automatic movement, and thereby retaining it in its proper position to insure at all times its surface bearing over the surface of the delivery-roller, the flanges also serving the purpose of retaining the sheets of pressed material within the length of the rollers.

My invention also consists in forming such annular flanges, when overlapping the ends of the pressure-roller, with grooves upon their periphery, which act as gutters for catching and conducting off such portions of the expressed liquid as may be carried up by and dropped from the ends of the grooves upon the face of the pressure-roller, which would otherwise fall upon and corrode the bearings.

My invention also consists, in connection with a grooved or fluted pressure-roller and a delivery-roller arranged with their axes in the same vertical plane, so as to bring one directly over the other, and a grooved or fluted feed-roller arranged in the front of and with its axis on a line between the axes of the delivery and pressure rollers, of a bar or plate disposed above and over the space between the feed and delivery rollers, which serves to close the space between them, and act as a bed, upon which the finely-divided particles of spent tan-bark or other like material are sustained and subjected to a continuous pressure while being fed along by the grooves upon the faces of the feed and pressure rollers.

My invention also consists in hanging or pivoting the bar or plate in a manner so that when the material to be operated upon is forced by the movement of the feed-roller upon the plate or bar, and begins to be subjected to pressure, the plate or bar will be slightly tipped, causing its forward edge to rest upon the smooth surface of the delivery-roller, to afford sufficient space for the escape of a portion of the expressed liquid.

My invention also consists in forming such bar or plate upon its outer edge with serrations, to allow the escape of the expressed liquid between it and the face of the delivery-roller.

My invention also consists in a chute hinged to the frame of the machine, and provided with means of adjustment to the desired angle in relation to the delivery-roller, and retaining its upper edge at a suitable distance from the face of the same.

My invention further consists, in connection with a flanged delivery-roller and a feed-roller, of a pressure-roller having its bearings in vertically-sliding boxes, and connecting with a system of weighted levers, so that the pressure-roller will be capable of automatic adjustment, for the purpose of permitting the distance between the said roller and the delivery-roller to accommodate itself to the constantly-varying thickness of the material passing between them.

In the accompanying drawings, C is designed to represent the channeled or fluted pressure-roller, arranged directly over the smooth-faced delivery-roller B; also, as having the feed-roller A arranged in the front of the bite of said pressure and delivery rollers. A bar or plate, D, is placed above and over the space between the feed-roller A and delivery-roller B, and serves to sustain the finely-divided particles of material, and subject them to a continuous pressure, in their passage to the bite of the pressure and delivery rollers.

It will be observed that the peculiar arrangement of the several rollers in relation to each other is such that the finely-divided particles of material receive a pressure sufficient during their passage between them to desiccate such particles, without the necessity of a second operation or the application of heated rollers.

A hopper, T, is arranged over the feed and pressure rollers to receive the wet spent tan-bark or other matter, and convey it to the bite of the same.

The channels of the feed-roller I prefer to make helicoidal, or to arrange in long helices, as illustrated in Fig. 4.

The bar or plate D may be pierced with numerous fine and conical holes *d*, each having its larger diameter at the bottom, in order that they may not become clogged with bark while the machine is in operation. This plate or bar has formed upon its outer edge serrations, as shown in Fig. 4, so that, when the edge bears upon the smooth surface of the delivery-roller B, there will be sufficient space left between them for the ready escape of the liquid. The bar or plate is also loosely connected to the ends of the feed-roller A by plates E.

At each end of the plate or bar D are formed projecting pivots *n*, having screw-threads thereon, and which pass through holes in the plates E, and afterward fastened by screw-nuts *o*. The plates E are formed with annular openings fitting in depressions or grooves upon the ends of the feed-roller A, which allows the same to revolve freely without disturbing the position of the plates E.

The pivots *n*, which partially support the plate or bar D, are placed at a suitable distance forward of the center of the same, creating a leverage, so that when the material to be operated upon is forced by the movement of the feed-roller A onto the surface of the bar or plate D, and begins to be subjected to pressure, it will be slightly tipped and move upon its pivots, so that its rear or serrated edge will rest upon the smooth face of the delivery-roller B, while its front edge will be slightly raised from the grooved surface of the feed-roller A, thus affording sufficient space for the escape of a portion of the expressed liquid. This movement also prevents any possibility of interference between the grooves of the feed-roller and the edge of the plate or bar; also, its position over the space between the delivery and feed rollers acts to sustain the finely-divided particles of the material, and prevent their falling through. The roller B is provided at its ends with grooved annular flanges *b b*. These flanges act to retain the sheets of pressed material within the length of the rollers, and overlap the ends of the pressure-roller C, for the purpose of acting as guides to the same, and prevent any lateral displacement of the pressure-roller during its automatic movement within the frame of the machine, thereby insuring its entire face coming in contact with the surface of the delivery-roller B. The grooves formed upon the periphery of the flanges *b b* act as gutters for catching and conducting off such portions of the expressed liquid from the ends of the grooves upon the face of the pressure-roller, which would otherwise fall upon and corrode the bearings, or else drip upon the sheet of pressed material as it passes from the machine. The pressure-roller C has its journals supported in boxes arranged to slide vertically and automatically in guides within the frame H, by which the main operating parts are supported. Levers M M, by means of rods $C^3$, serve to press downward the said boxes, such levers being connected, by rods *r r*, with levers S, arranged as shown, and having weights T′ suspended therefrom by rods R R. This system of weighted levers for applying the requisite pressure to the large expressing-roller C admits of such roller being self-adjusting to the constantly-varying thickness of the sheet of tan-bark or other material passed between the rollers, giving at all times a uniform and continuous pressure, whatever may be the thickness or quantity of the material introduced; also allowing the roller C to automatically rise with its bearings, and permit the free passage of large or very hard objects which might accidentally be introduced into the hopper, thereby preventing the possibility of straining or otherwise injuring the operating parts of the press. Underneath the rollers B C is a suitable receiving trough or pan, G, provided with an educt, *g*, to lead into a drain, conduit, or other proper receptacle arranged below the same.

For imparting motion to the roller C, there is fixed upon its shaft a spur-gear, $C^1$, engaging with a pinion, $C^2$, upon a horizontal shaft, *d′*. This pinion $C^2$ engages with a similar gear, *b′*, connected to the shaft *e*, and a like gear upon said shaft engages with a spur-gear, $B^2$, on the shaft of the roller B. Furthermore, on the shaft *e* is a gear, *f*, engaging with a pinion, *g′*, on a driving-shaft, *h*, arranged as represented, and provided with a fly-wheel, V, and fast and loose pulleys P P′. Gears *x y*, upon the shafts of the rollers A C, impart motion to the feed-roller A. A chute, consisting of a flat plate, J, is made adjustable by being hinged to the frame H, and is provided with set-screws *j*, for regulating its inclination to the proper angle in relation to the lower delivery-roller B, so that its inner edge will not rest upon or touch the face of the roller, but will be maintained at a slight distance from it, so as to leave a small clear space between its inner edge and the face of the roller for the escape of the expressed liquid to the receptacle provided for it under the press; otherwise a considerable portion of the liquid, which naturally flows upon the face of the lower delivery-roller B, would be reabsorbed by the sheet of pressed material at the movement of its passage from between the bite of the rollers B C to the inner edge of the inclined chute.

The operation of my invention is as follows: While the pressure-cylinders are in motion, the material to be pressed is thrown into the hopper, from whence it is delivered between the two rollers A C, and there receives its first pressure, passing in its course over the bar or plate D, to the bite of the rollers B C, and by them is still further compressed, after which it passes over the inclined chute J to any suitable receptacle that may be placed there to receive it.

The press may be used, if desired, for extracting the juice from sugar-cane and various other vegetable matters.

Having now fully described the construction and operation of my invention, what I claim as new, and desire to secure by Letters Patent, is—

1. The combination, with a pressure-roller arranged to slide vertically and automatically within the frame of the machine, of a delivery-roller having annular flanges, which overlap the ends of the pressure-roller, and act as guides to prevent any lateral displacement of the same, substantially as and for the purpose specified.

2. The delivery-roller having annular flanges, which overlap the ends of the pressure-roller, and formed with grooves upon their periphery, for the purpose of conducting off such portions of the expressed liquid as may be carried up by and dropped from the ends of the grooves upon the face of the pressure-roller, substantially as and for the purpose set forth.

3. The combination, with a delivery-roller and a grooved or fluted pressure-roller, having their axes in the same vertical plane, and a grooved or fluted feed-roller arranged in the front of and with its axis on a line between the axes of the delivery and pressure rollers, of a bar or plate placed above and over the space between the feed and delivery rollers, to sustain the finely-divided particles of material and subject them to a continuous pressure while they are fed along by the grooved surfaces of the feed and pressure rollers, substantially as and for the purpose set forth.

4. The combination, with a feed, a pressure, and a delivery roller, of a pivoted bar or plate, substantially as and for the purpose set forth.

5. The combination, with a delivery-roller, of a pivoted bar or plate formed with serrations upon its outer edge, to allow the escape of the expressed liquid between it and the face of the delivery-roller, substantially as and for the purpose specified.

6. The combination, with a delivery-roller, of a hinged chute, provided with a means of adjustment, substantially as and for the purpose set forth.

7. The combination, with a flanged delivery-roller and a feed-roller, of a pressure-roller, having its journals in vertically-sliding boxes, and connecting with a system of weighted levers, substantially as and for the purpose described.

In testimony that I claim the above I have hereunto subscribed my name in the presence of two witnesses.

LAURENT BREVAL.

Witnesses:
M. TARMEUX,
LOUIS ALEXANDRE.